(12) United States Patent
Gurcan et al.

(10) Patent No.: US 7,647,317 B2
(45) Date of Patent: Jan. 12, 2010

(54) SEARCH TECHNIQUES FOR PAGE-BASED DOCUMENT LAYOUTS

(75) Inventors: Ahmet Gurcan, Mercer Island, WA (US); Khaled Sedky, Sammamish, WA (US); Oliver Foehr, Mercer Island, WA (US); Jerry Dunietz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/694,558

(22) Filed: Mar. 30, 2007

(65) Prior Publication Data

US 2008/0243814 A1  Oct. 2, 2008

(51) Int. Cl.
*G06F 17/30* (2006.01)
*G06F 7/00* (2006.01)

(52) U.S. Cl. .................. 707/5; 707/2; 707/104.1; 707/200

(58) Field of Classification Search .................. None
See application file for complete search history.

(56) References Cited

U.S. PATENT DOCUMENTS

| | | | |
|---|---|---|---|
| 5,999,664 A | 12/1999 | Mahoney et al. | |
| 6,021,409 A | 2/2000 | Burrows | |
| 6,055,538 A | 4/2000 | Kessenich et al. | |
| 6,594,665 B1 | 7/2003 | Sowa et al. | |
| 6,675,159 B1 | 1/2004 | Lin et al. | |
| 6,963,869 B2 | 11/2005 | Burrows | |
| 7,003,506 B1 | 2/2006 | Fisk et al. | |
| 7,054,859 B2 | 5/2006 | Kuno et al. | |
| 2002/0073119 A1* | 6/2002 | Richard | 707/513 |
| 2004/0030581 A1 | 2/2004 | Shannon | |
| 2006/0170952 A1 | 8/2006 | Hamada | |

OTHER PUBLICATIONS

Gibson, The Volume and Evolution of Web Page Templates, May 2005, Chiba, Japan, ACM 1-59593-051-May 5, 0005, pp. 830-839.*
Clarke, et al., "An Algebra for Structured Text Search and A Framework for its Implementation", retrieved at <<http://www.cs.uwaterloo.ca/research/tr/1994/30/structxt.pdf>>, Technical Report CS-94-30, Aug. 24, 1994, University of Waterloo, Waterloo, Canada, pp. 1-24.
Moura, et al., "Fast and Flexible Word Searching on Compressed Text", retrieved at <<http://delivery.acm.org/10.1145/350000/348754/p113-silva_de_moura.pdf?key1=348754&key2=3628036511&coll=GUIDE&dl=GUIDE&CFID=763350&CFTOKEN=11920893>>, ACM, 2000, ACM Transactions on Information Systems, vol. 18, No. 2, Apr. 2000, pp. 113-139.
Zobel, et al., "Efficient Retrieval of Partial Documents" retrieved at <<http://www.seg.rmit.edu.au/research/download.php?manuscript=63>>, Jun. 1994, pp. 1-21.

* cited by examiner

*Primary Examiner*—Greta L Robinson
*Assistant Examiner*—James J Wilcox
(74) *Attorney, Agent, or Firm*—Lee & Hayes, PLLC (57) ABSTRACT

Systems, methods, and/or techniques ("tools") for improved search techniques for page-based document layouts are described herein. The tools may analyze markup elements defined for pages within source documents, and may determine whether the markup elements for the page may include at least part of a search string.

16 Claims, 5 Drawing Sheets

SEARCH TECHNIQUES FOR PAGE-BASED DOCUMENT LAYOUTS

BACKGROUND

Traditionally, viewable documents have been stored as a set of pages. When a user wishes to view a document, all pages of the document would be opened, loaded into memory, and presented to the user upon demand. This approach may consume excessive memory, with portions of the documents being loaded despite the fact that the user may never demand to view them. However, page-based markup documents are becoming more widely used. With page-based markup documents, pages are retrieved, marked up, and loaded into memory upon demand, resulting in reduced memory consumption and faster performance.

When a user wishes to, for example, search for a given string within a page-based markup document, this may present challenges. To do a comprehensive search, all pages of the markup document may be loaded and rendered before the precise location of the search string can be determined. Assuming that loading and rendering each page takes a given amount of time, the overall search process would take at least that given amount of time, multiplied by the total number of pages in the document. For some documents, this scenario may be unacceptable, and may result in excessively lengthy search times.

SUMMARY

Systems, methods, and/or techniques ("tools") for improved search techniques for page-based document layouts are described herein. The tools may analyze markup elements defined for pages within source documents, and may determine whether the markup elements for the page may include at least part of a search string.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to improved search techniques for page-based document layouts are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide improved search techniques for page-based document layouts. Using the techniques described herein, the markup analysis can be performed much faster and with less memory consumption, as compared to completely loading and rendering the pages. This discussion also describes other techniques and/or processes that the tools may perform.

Figure 1:
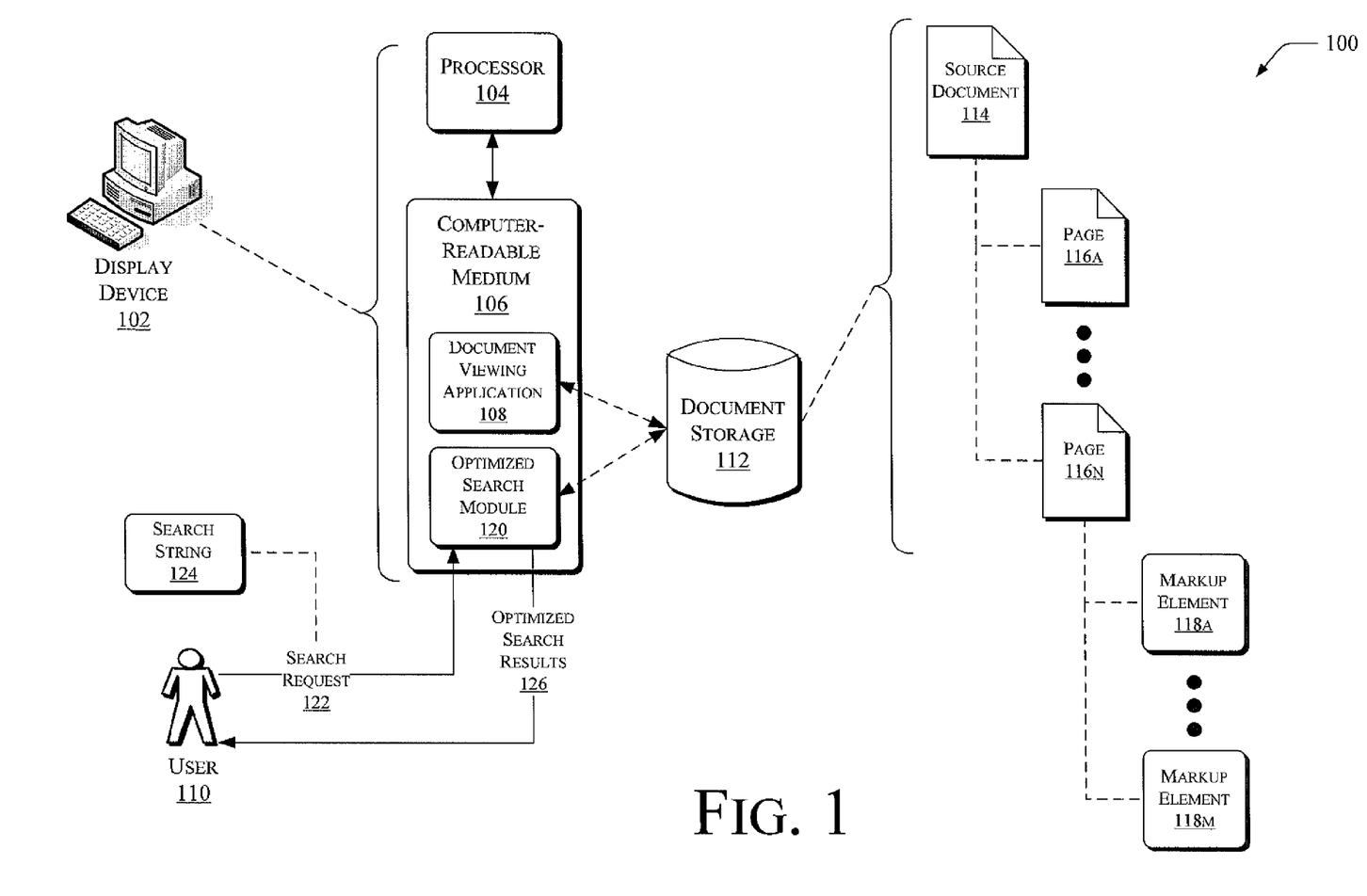
FIG. 1 is a block diagram of example environments in which the tools for improved search techniques for page-based document layouts may operate.

FIG. 1 illustrates example environments 100 in which the tools for improved search techniques for page-based document layouts may operate. These operating environments 100 may include one or more display devices 102, which are depicted as shown in FIG. 1 for example, but not limitation. These display devices could also take the form of desktop workstations, portable or handheld devices, or server-based systems that service one or more clients.

The display devices 102 may be computer-based systems that include one or more processors, denoted at 104. These processors may also be categorized or characterized as having a given type or architecture, but may or may not have the same type or architecture.

The display devices 102 may also include one or more instances of machine-readable or computer-readable storage media, denoted generally at 106. The computer-readable media 106 may contain instructions that, when loaded into and executed by the processor 104, cause the display devices 102 to perform any of the tools or related functions that are described herein. The processor may access and/or execute the instructions embedded or encoded onto the computer-readable media, and/or may access data stored in the computer-readable media.

Turning in more detail to the computer-readable media 106, it may include one or more instances of a document viewing application 108. This document viewing application may enable users, represented generally at 110, to access document storage areas 112, and retrieve source documents 114 therefrom for display. The document viewing application may interact with the document storage areas, as generally denoted by the dashed line between blocks 108 and 112. FIG. 1 denotes the source documents generally at 114. However, it is noted that implementations of the document storage areas 112 may contain an arbitrary number of documents 114, and FIG. 1 shows only one example document only for ease of illustration.

Turning to the source documents 114 in more detail, these source documents may be page-based markup documents, which include a plurality of pages, denoted generally at 116. FIG. 1 shows two examples of the pages at 116a and 116n, but implementations of the source documents may contain an arbitrary number of pages.

The source documents 114 may provide a "spine", which may serve as a type of frame around which the document is built and rendered to the user. When the user demands a particular page (e.g., 116n) of the document, for example by scrolling through the document, the document viewing application 108 may retrieve the particular page from the document storage 112, and format it for display to the user. In this manner, the pages of the document are typically not processed until the user demands to view them. This approach may save considerable time and processing resources.

Turning to the pages 116 in more detail, these pages may include one or more markup elements, denoted generally at 118. FIG. 1 shows two examples of these markup elements at 118a and 118m, but implementations of the pages may include an arbitrary number of markup elements.

Example implementations of the tools may use the XPS document format which is provided by Microsoft Corporation of Redmond, Wash. XPS documents may contain FixedPages elements, which can contain text, drawings, images, and other elements. These FixedPages elements provide non-limiting examples of the markup elements 118. Text appearing on a page may be specified in Glyphs elements. An example Glyphs element is shown here:

```
<Glyphs Fill="#000000" FontUri="font_1.TTF"
FontRenderingEmSize="12"
OriginX="277.28" OriginY="533.6"
UnicodeString="Healthcare Industries" />
```

Glyphs elements may specify how to render specific text, as well as its meaning (actual text), which may be specified in the UnicodeString property. The UnicodeString property may support various interactivity features offered to users, such as copy-paste, search functions, screen reading, or the like.

To render a particular page for viewing by the user, the document viewing application 108 processes the markup elements 118 for that particular page. Depending on how a particular page has been authored or is to be rendered, the markup may specify elements in an order different from how the elements are ultimately rendered to the user. In the example Glyphs element provided above, the OriginX and OriginY attributes determine the location on the page at which the element is rendered, whereas the Z-order of the element (i.e., the order in the element is rendered relative to one or more overlapping elements) is determined by the order in which the markup defines these elements. For example, elements that appear first in the markup file may appear at the bottom of the rendered page, and vice versa. When rendering the pages in this environment, and also when determining the locations of paragraphs, tables, and other elements that may appear on the pages, the document viewing application 108 may use heuristic techniques and algorithms to determine the logical reading order of content.

The user 110 may wish to perform one or more searches on the document 114. To facilitate such searches, the computer-readable medium 106 may include an optimized search module 120. In overview, the optimized search module 120 may prune down a set of candidate pages in an efficient manner without laying out and rendering the pages, may layout and render some subset of the candidate pages, and search only within the rendered subset of candidate pages.

The optimized search module 120 may receive a search request 122 from the users, with the search string sought by the users being denoted generally at 124. In response to the search request, the optimized search module 120 may search the document, and return optimized search results, represented generally at 126. FIG. 1 denotes interactions between the optimized search module and the document storage area by the dashed line connecting blocks 120 and 112.

Figure 2:
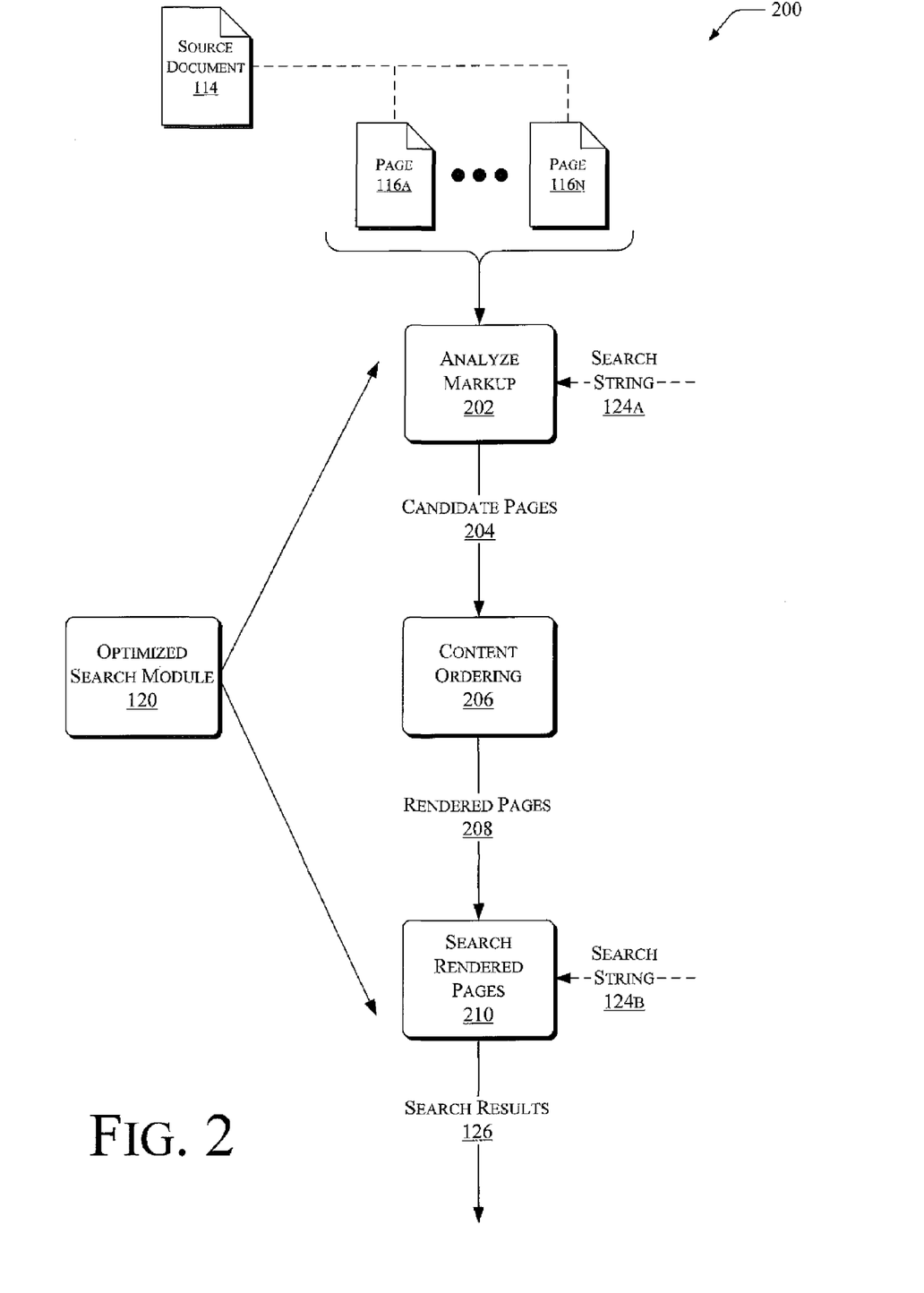
FIG. 2 is a combined block and data flow diagram providing additional details relating to an optimized search module provided as part of the tools described herein.

Having described the operating environments 100 with FIG. 1, the discussion now proceeds to a description of components and data flows relating to the optimized search module, now presented with FIG. 2.

FIG. 2 provides components and data flows, denoted generally at 200, relating to the optimized search module 120 shown in FIG. 1. For convenience but not limitation, some elements described previously are carried forward into FIG. 2, and denoted by identical reference numbers.

Turning to the optimized search module 120 in more detail, it may include a markup analysis component, denoted at 202. This markup analysis component 202 may receive an input search string (e.g., 124a) as provided by the user, and search markup elements (e.g., 118) in a source document (e.g., 114) to locate all occurrences of the search string within that markup. More specifically, the markup analysis component may preliminarily process the pages of the source document, to identify those pages of the document in which the search string may occur. FIG. 2 carries forward the example document pages 116 and 116n. Analyzing the markup may include parsing the markup to locate places where at least portions of the search string may occur.

The markup analysis component 202 may output one or more candidate pages, denoted at 204. These candidate pages 204 represent those pages in which at least a portion of the input search string may occur. Thus, these candidate pages 204 have survived a form of elimination process performed by the markup analysis component.

The search module 120 may include a content ordering component 206. The content ordering component 206 receives the one or more candidate pages 204 of the source document 114, and processes the markup for these candidate pages 204. More specifically, the content ordering component 206 may process the markup elements (e.g., 118 in FIG. 1) for the candidate pages, thereby rendering the candidate pages as they would be presented to the user. FIG. 2 denotes the rendered candidate pages at 208.

The search module 120 may include a search module 210. The search module 210 may receive the rendered pages 208, and search these rendered pages for the input search string, denoted at 124b. Recall that the rendered pages 208 have been rendered as they would appear to the user. Thus, if the search module 120 locates the search string within these rendered pages, the search module may indicate exactly where the search string appears within the rendered pages, as reflected in the search results 126.

The components and data flows of the optimized search module 120 as shown in FIG. 2 may provide performance advantages over previous approaches. In some cases, the markup analysis component 202 may determine that most of the pages in the input document do not contain the input search string, and eliminate these pages from rendering and further search. Thus, the markup analysis component 202 may pass forward a relatively small subset of the pages as the candidate pages 204. Additionally, searching on the rendered pages is an incremental process, in that the component 202 provides the candidate pages 204 to the content ordering component 206 one at a time, instead of searching the whole document and establishing a set of candidate pages.

Turning to the content ordering component 206, in the examples shown in FIG. 2, the content ordering component only renders the markup associated with the candidate pages 204, rather than all of the pages in the source document. Processing markup elements into a rendered page suitable for viewing may be an expensive process, in terms of time and computational resources. For documents containing dozens or hundreds of pages, the overall rendering process may take on the order of tens of seconds, which may be unacceptable. However, the components and data flows shown in FIG. 2 may reduce the number of pages that are actually rendered during the search process, thereby achieving savings of time and computational resources.

Turning to the search component 210, it may search for the input search string in only a subset of the pages of the source document, rather than all pages of the source document. More specifically, the search component may search for the input search string only in the rendered pages 208, as output from the content ordering component 206. As compared to searching the entire source document 114 in rendered form, the search component may also achieve savings of time and computational resources. If the search component 210 fails to find the search string in the rendered pages, then the process may continue with the next candidate page, but has not expended the resources involved in rendering the entire document.

Figure 3:
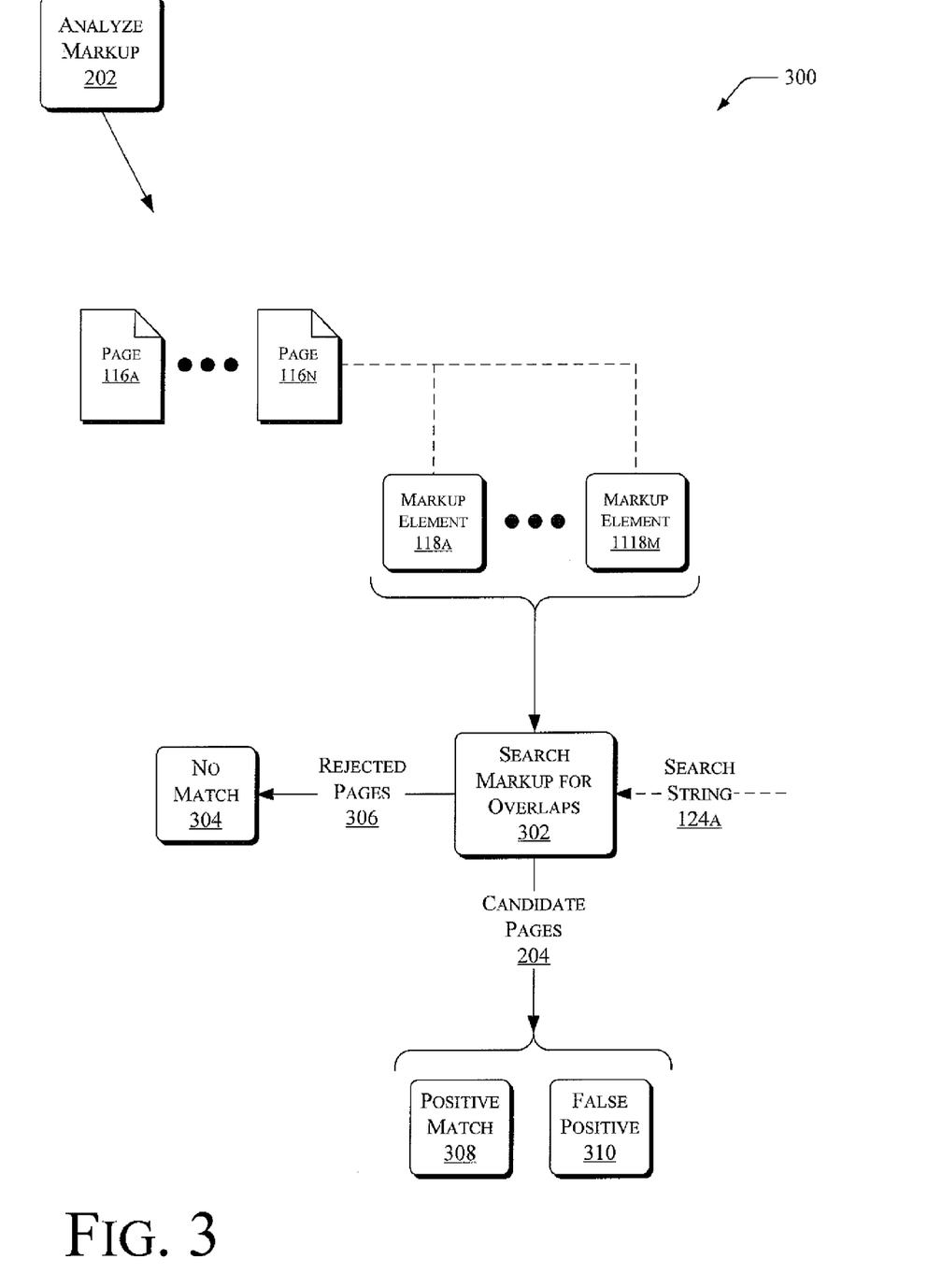
FIG. 3 is a combined block and data flow diagram providing additional details relating to a markup analysis process provided as part of the tools described herein.

Having described the components and data flows relating to the optimized search module with FIG. 2, the discussion now proceeds to a description of components and data flows relating to the markup analysis component 202, now presented with FIG. 3.

FIG. 3 illustrates components and data flows, denoted generally at 300, for the markup analysis component 202 shown in FIG. 2. For convenience but not limitation, some elements described previously are carried forward into FIG. 3, and denoted by identical reference numbers.

Recalling from FIG. 1, the source document (not shown in FIG. 3) may include one or more pages (e.g., 116*a* and 116*n*), which in turn may include one or more markup elements (e.g., 118*a* and 118*m*). The markup analysis component 202 may include an overlap search component 302 that searches for occurrences of the input search string 124*a* within the markup elements. More specifically, the search component 302 may search for at least partial matches of the input search string within the markup elements 118.

As described above, the markup analysis component 202 searches the pages, without actually rendering the pages into final form for presentation to the user. As shown in FIG. 3, the overlap search component 302 may search the markup for these pages, without actually rendering the markup into final form for presentation. Put differently, one goal of the markup analysis component (and more specifically, the overlap search component) at this point is to find those pages and markup that might contain the input search string, without regard to where the input search string may actually occur within those pages and markup as actually rendered.

FIG. 3 illustrates three scenarios that may result from the processing of given markup by the overlap search component 302. FIG. 3 provides these three scenarios in overview, while FIG. 4 provides more detail below.

In some scenarios, no portion of the input search string occurs in the markup elements for a given page. This scenario may be considered a "no match" scenario, denoted at 304. If a "no match" scenario occurs, the given page is eliminated from further consideration, and the page is a "rejected" page, denoted at 306.

In other scenarios, all portions of the search string may occur somewhere in the given page. If the entire search string appears together, such that the entire search string appears together on the given page, this scenario may be considered a "positive match" scenario, denoted at 308. However, if all portions of the search string appear somewhere on the given page, but not together to form the entire search string, then this scenario may be considered a "false positive" scenario, denoted at 310. If either of the scenarios 308 or 310 occur, then the page is forwarded for further processing, and the page is a candidate page 204. It is noted that the tools as shown in FIGS. 3 and 4 may not distinguish between these scenarios 308 and 310, but may instead detect those pages that may exhibit these scenarios.

Figure 4:
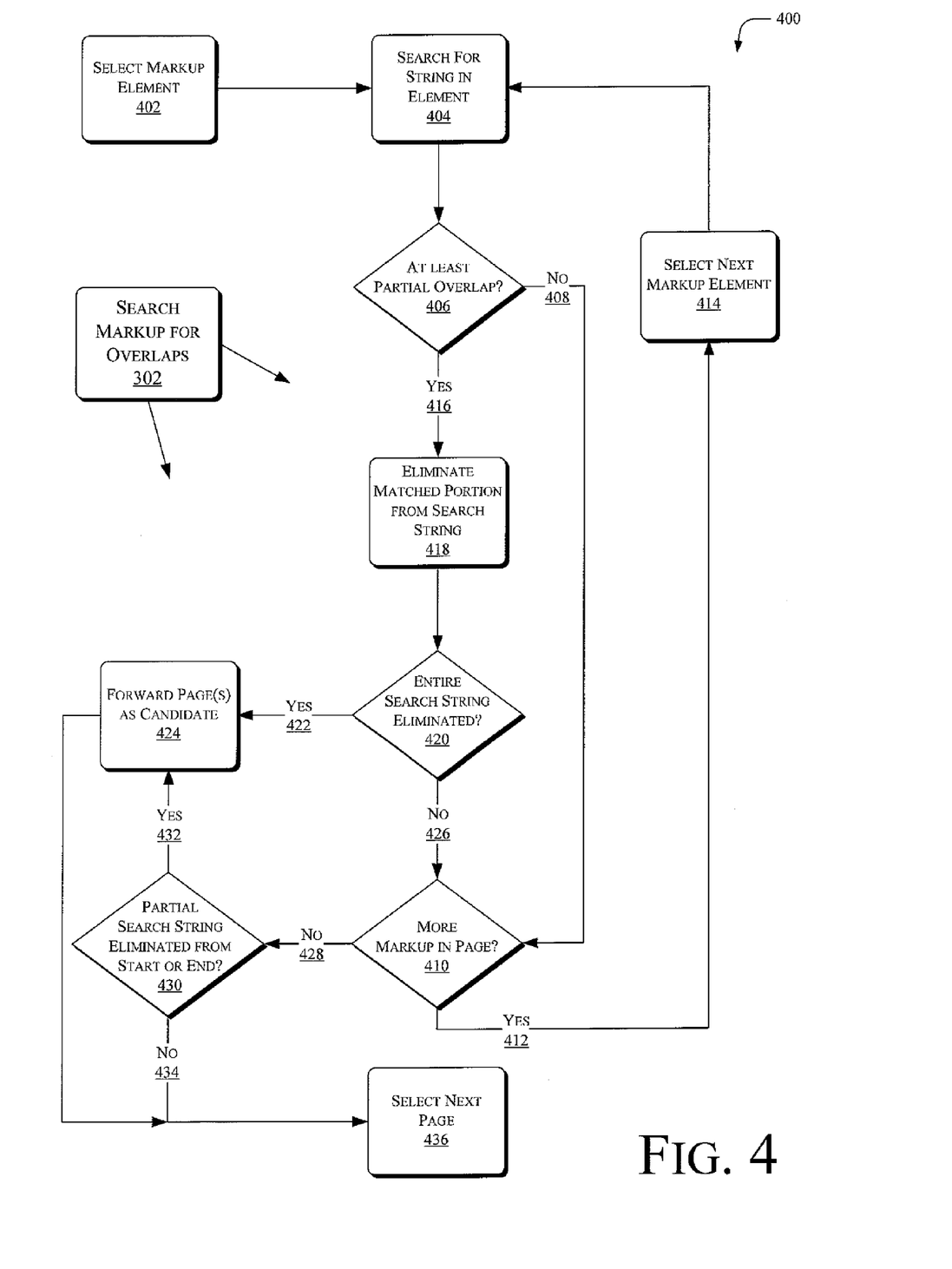
FIG. 4 is a flow diagram illustrating processes for selecting candidate pages from within a given document, provided as part of the improved search techniques for page-based document layouts.

FIG. 4 illustrates more detailed process flows, denoted generally at 400, for identifying the above scenarios in given pages. For convenience but not limitation, some elements described previously are carried forward into FIG. 4, and denoted by identical reference numbers.

For convenience and ease of illustration, the process flows 400 are shown as being performed by the search component 302 that looks for overlap between input strings and markup elements. However, at least portions of the process flows 400 may be performed by other components without departing from the scope and spirit of the description herein.

As illustrated in FIG. 4, block 402 represents selecting a markup element defined within a given page. Block 402 may include traversing the markup elements in any convenient order. FIG. 3 shows examples of pages at 116*a* and 116*n*, and shows examples of markup elements at 118*a* and 118*m*.

Block 404 represents searching for at least a portion of the input search string (e.g., 124*a* in FIG. 3) in a text field defined within the selected markup element. A non-limiting example of such a text field is the UnicodeString field in the XPS excerpt provided above in this description.

Block 406 represents evaluating whether at least a portion of the input search string occurs in the selected markup element. If not, the process flows 400 may take No branch 408 from block 406. In these cases, the process flows 400 may result in a "no match" scenario, denoted in FIG. 3 at 304.

The No branch 408 leads to block 410, which represents determining whether the current page contains any more markup elements. If so, the process flows 400 may take Yes branch 412 to block 414, which represents selecting another markup element defined for the current page. Afterwards, the process flows 400 may return to block 404 to search for the input string in the newly-selected markup element.

Returning to block 406, if at least a portion of the input search string occurs in the markup element, then the input search string is said to "overlap" with the markup element. In these cases, the process flows 400 may result in either a "positive match" scenario or a "false positive" scenario, denoted respectively in FIG. 3 at 308 and 310.

If at least a partial overlap occurs, then the process flows 400 may take Yes branch 416 to block 418, which represents eliminating from further consideration the portion of the input search string that overlapped with the markup element. After block 418, the process flows 400 will not attempt to search for any part of the input search string that has already been found in the markup elements defined for a given page.

Block 420 represents evaluating whether the entire input search string has been eliminated from further consideration. Put differently, block 420 may include determining whether all parts of the input search string have been found somewhere on the given page. If all of the input search string has been found on the page, then the process flows 400 may take Yes branch 422 to block 424, which represents forwarding at least the given page as a candidate page (e.g., 204). As described in more detail below, block 424 may include forwarding not only the given page, but also the page before the given page and the page following the given page. Forwarding the preceding page and the next page enables searching for partial matches that bridge two rendered pages. These partial matches may bridge from the end of the previous page to the beginning of the given page, or may bridge from the end of the given page to the beginning of the next page.

Returning to block 420, if the entire search string has not yet been found on the page, and thus eliminated from further search, then the process flows 400 may take No branch 426 to block 410. Recall that block 410 represents evaluating whether the given page contains more markup elements to be searched. If the given page contains more markup elements, then the process flows 400 may take Yes branch 412, as described above. On the other hand, if the entire markup on a given page has been searched, then the process flows 400 may take No branch 428 to block 430, which represents evaluating whether at least part of the input search string has matched any of the markup at the beginning or the end of a page. Block 430 may include evaluating whether a complete search string match exists in the markup of two consecutive pages. If so, block 430 may evaluate to true, and the two consecutive pages are candidates for bridging text.

If block 430 evaluates to true, then the process flows 400 may take Yes branch 432 to block 424. As described above, block 424 represents forwarding the current page as a candidate page. If the process flows 400 reach block 424 via block 430, then block 424 may include sending not only the current page, but also the preceding page and the next page to enable searches for partial matches.

Returning briefly to block 430, if no match has occurred within the markup on a given page, then the process flows 400 may take No branch 434 to block 436, which represents selecting a next page in the source document. Block 436 may include logic for testing for end-of-page or end-of-file conditions. Additionally, the process flows 400 may perform block 436 after performing block 424.

Figure 5:
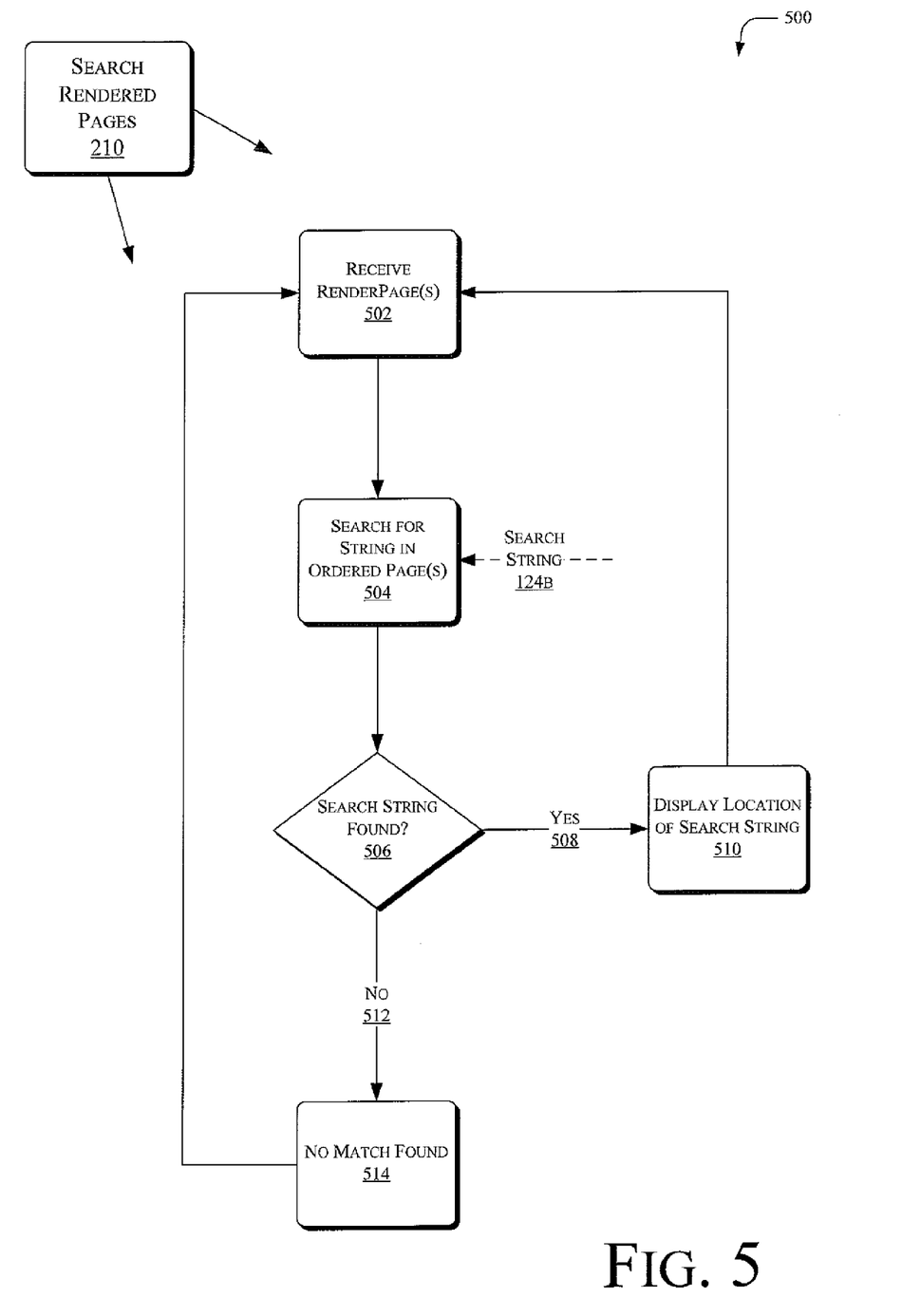
FIG. 5 is a flow diagram illustrating processes for searching for input strings within rendered candidate pages.

If the process flows 400 reach block 410, then some level of match has occurred between the input search string and the markup elements on the page. This match may be: a full match, in which the entire search string occurs together in the markup; a false positive match, in which the entire search string appears in the markup, although not together; or a partial match, in which only part of the search string is found. The latter scenario may occur when the search string bridges two pages, such that only a portion of it appears on either of the pages. However, because the process flows 400 operate on the markup elements alone, rather than the fully-rendered pages, the process flows 400 do not distinguish between a full match, a false positive, or a partial match, in some scenarios. Instead, the tools may not distinguish between these scenarios until the pages are rendered and searched, as shown in FIG. 5 below.

Having described the process flows 400 above, the discussion now proceeds to the following illustrative but non-limiting example. Assume that a given page (e.g., 116) contains at least four markup elements (e.g., 118) that respectively define the following four text strings, as these strings would be rendered in the document. For ease of reference, these four text strings are shown in Table 1:

TABLE 1

"The quick"
"brown fox"
"jumps over the"
"lazy dog".

As described above, the markup elements may be defined in any order, regardless of how the final rendering of the document may appear. Thus, the markup elements may, for example, appear in the following order in the markup, as presented in Table 2:

TABLE 2

"brown fox"
"The quick"
"lazy dog"
"jumps over the".

Assume, for example, that the input search string (e.g., 124) is "fox jumps over". In this case, referring to the markup in Table 2, the process flows 400 would find "fox" in the first markup element, eliminate "fox" from the input search string, and continue searching the rest of the markup until it finds "jumps over" in the last markup element. At this point, the process flows 400 would eliminate the rest of the input search string, which indicates that the all portions of the search string occur somewhere in the markup. Thus, the process flows 400 would forward the current page as a candidate page for rendering and search.

Referring briefly to Table 1, the input search string ("fox jumps over") does occur in the rendered page. However, the process flows 400 will not "know" this yet, because the process flows 400 operate only on the markup elements, rather than the fully-rendered text. Thus, false positives may occur, as indicated in the following example.

In another example, assume that the input search string is "lazy dog jumps". Running the input search string through Table 2, the process flows 400 may find the phrase "jumps" in the third markup element, and eliminate that phrase from the input search string, leaving only "lazy dog". The process flows 400 would then find the phrase "lazy dog" in the last markup element, thereby finishing the input search string. However, referring briefly to Table 1, while all portions of the input search string "lazy dog jumps" do occur in the markup itself, the string "lazy dog jumps" does not occur in the actual rendered page. Thus, this is an example of a false positive scenario, but the tools do not detect this false positive until the page is rendered and searched.

As another example, assume that the input search string is "quick brown elephant". In this case, the terms "quick" and "brown" are in the markup, but the term "elephant" is not. In this case, a partial match has occurred. However, this partial match may have occurred because the input search sting bridges two pages. Thus, to account for the possibility that the missing term "elephant" might be the first word in the next page, the process flows 400 may forward not only the candidate page that contains the terms "quick" and "brown", but also the next page. The first contents of the next page might be the missing portions of the input search string. In this manner, the markup analysis performed by the process flows 400 may enable detection of these bridging scenarios by forwarding two or more candidate pages based on the results of analyzing the markup on one page. For example, if the process flows 400 forward a given candidate (e.g., 204) to the rendering or content ordering module 206, then the rendering module may load the candidate page, and search for a possible bridging scenario. If a bridging scenario is possible, (e.g., as indicated by a paragraph bridging a page or not), then the rendering module may load the next page or the preceding page and finalize a decision on whether a bridging scenario exits.

Having described the process flows 400 for performing markup analysis and selecting candidate pages in FIG. 4, the discussion now turns to a description of processes for searching for input strings within rendered candidate pages, now presented with FIG. 5.

FIG. 5 illustrating process flows 500 for searching for input strings within rendered candidate pages. For convenience but not limitation, some elements described previously are carried forward into FIG. 5, and denoted by identical reference numbers.

The process flows 500 as shown in FIG. 5 provide more details of the processing performed by block 210, which represents searching content-ordered or content-rendered pages for any occurrences of the input search string. In implementations in which a loader module builds an internal object model of the content-ordered page, then the loader module may consume most of the rendering time. Thus, these pages may also be referred to as "loaded" pages. Block 502 represents receiving candidate pages (e.g., 204) in rendered form. FIG. 2 provides examples of rendered pages at 208.

Block 504 represents searching for the input search string in the pages. FIG. 2 provides an example of the input search string at 124b. Assuming that the pages have been ordered for content (e.g., block 206 in FIG. 2), then block 504 may include searching within rendered pages.

Block 506 represents evaluating whether the search string was found in one or more rendered pages. Block 506 may include searching for the entire search string in a given page, or searching for a search string that bridges two pages.

Additionally, recall from the discussion above that some of the candidate pages may be "false positives", in the sense that the markup for these pages may contain all portions of the search string, while the entire search string does not occur together in the rendered page. Thus, some candidate rendered pages may not contain the entire search string.

From block 506, if a given rendered page contains the search string, then the process flows 500 may take Yes branch 508 to block 510, which represents displaying one or more locations within the rendered page at which the search string was found. It is noted that search strings may occur more than once within given rendered pages. Block 510 may include highlighting or otherwise indicating the search string to a user (e.g., 110). Afterwards, the process flows 500 may return to block 502 to await the next rendered page.

Returning to block 506, if the given rendered page does not contain the search string, the process flows 500 may take No branch 512 to block 514, which may represent a "no-op" state that the process flows 500 enter when, for example, a false positive occurs. Afterwards, the process flows 500 may return to block 502 to await the next rendered page.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. One or more computer-readable storage media comprising computer-readable instructions that, when executed by a processor, cause a computer-controlled device to perform a computer-implemented method for searching a page-based markup document for an input search string, the method comprising:
    receiving, at the computer-controlled device, at least one search request including the input search string from a user;
    analyzing, by the computer-controlled device, markup elements defined for a plurality of pages within at least one source document, wherein the markup elements comprise at least one of text, drawings, formatting, or images, and the source document is an unrendered version of the page-based markup document;
    determining whether the markup elements for the pages may include at least part of the input search string;
    selecting at least one page from the plurality of pages as a candidate page for rendering, the selecting in response to determining that the markup elements for the page include at least part of the input search string;
    rendering the at least one candidate page;
    determining whether the search string occurs in the rendered candidate page;
    indicating at least one location within the rendered candidate page at which the search string occurs; and
    outputting search results that indicate where the input search string occurs in the rendered page based on the source document.

2. The computer-readable storage media of claim 1, wherein the instructions for analyzing at least one markup element include instructions for searching for at least part of the search string in the markup element.

3. The computer-readable storage media of claim 2, further comprising instructions for locating at least a portion of the search string in the markup element, and for eliminating at least the portion of the search string from further search on a given page of the source document once it has been located on the given page of the source document.

4. The computer-readable storage media of claim 2, further comprising instructions for locating at least a further portion of the search string in the markup element, and for eliminating at least the further portion of the search string from further search on a given page of the source document once it has been located on the given page of the source document.

5. The computer-readable storage media of claim 1, further comprising instructions for forwarding at least the candidate page for rendering.

6. The computer-readable storage media of claim 1, further comprising instructions for searching a rendered version of the candidate page to determine whether the search string occurs in the rendered candidate page.

7. A system configured to search a page-based markup document for an input search string, the system comprising:
    a processor;
    memory;
    a first search component residing in the memory, the first search component configured to receive the input search string from a user and search for at least a portion of the input search string in a given page within the page-based markup document prior to the page-based markup document having been rendered, the first search component further configured to forward the given page for rendering if portions of the input search string occur within selected markup elements in the given page;
    a rendering module configured to render the given page; and
    a second search component configured to determine whether the input search string occurs in the rendered page, the second search component further configured to indicate at least one location within the rendered page at which the search string occurs.

8. The computer-readable storage media of claim 1, further comprising instructions for determining that the search string does not occur in the rendered candidate page.

9. The computer-readable storage media of claim 1, further comprising instructions for determining that no markup elements defined for the page contain any portion of the search string.

10. The computer-readable storage media of claim 9, further comprising instructions for eliminating the page from rendering and search.

11. The computer-readable storage media of claim 9, further comprising instructions for rejecting the page.

12. The computer-readable storage media of claim 1, further comprising instructions for selecting a further candidate page, wherein the further candidate page is either immediately previous to the candidate page in the source document, or immediately after the candidate page in the source document.

13. The computer-readable storage media of claim 12, further comprising instructions for rendering the candidate page and the further candidate page, and for searching the rendered candidate page and the rendered further candidate page for the search string.

14. The computer-readable storage media of claim 13, further comprising instructions for locating a portion of the search string on the rendered candidate page and for locating a further portion of the search string on the further rendered candidate page.

15. A display device including at least a processor and the computer-readable storage medium of claim 1.

16. A computer-implemented method for searching a page-based markup document for an input search string, the method comprising:
    analyzing, by a processor, markup elements defined for a plurality of pages within at least one source document, the source document being an unrendered page-based markup document stored in a computer readable storage media;
    determining whether the markup elements for the pages may include at least part of an input search string;
    selecting at least one page from the plurality of pages as a candidate page for rendering, the selecting in response to determining that the markup elements for the page include at least part of the input search string;
    rendering the at least one candidate page;
    determining whether the search string occurs in the rendered candidate page;
    indicating at least one location within the rendered candidate page at which the search string occurs; and
    outputting search results that indicate where the input search string occurs in the rendered candidate page based on the source document.

* * * * *